(12) United States Patent
Eom et al.

(10) Patent No.: US 9,689,741 B2
(45) Date of Patent: Jun. 27, 2017

(54) METHOD AND APPARATUS FOR MEASURING ULTRAVIOLET LIGHT EXPOSURE

(71) Applicant: Samsung Electronics Co., Ltd., Gyeonggi-do (KR)

(72) Inventors: Kihun Eom, Gyeonggi-do (KR); Dohyoung Chung, Seoul (KR); Kihong Min, Seoul (KR); Jeongmin Park, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/878,264

(22) Filed: Oct. 8, 2015

(65) Prior Publication Data
US 2016/0109289 A1  Apr. 21, 2016

(30) Foreign Application Priority Data
Oct. 17, 2014 (KR) .......................... 10-2014-0140667

(51) Int. Cl.
*G01J 1/42* (2006.01)
*G01J 1/02* (2006.01)

(52) U.S. Cl.
CPC ............. *G01J 1/429* (2013.01); *G01J 1/0228* (2013.01); *G01J 1/0233* (2013.01); *G01J 1/0242* (2013.01)

(58) Field of Classification Search
CPC ........................................................ G01J 1/429
See application file for complete search history.

(56) References Cited

U.S. PATENT DOCUMENTS

| | | | |
|---|---|---|---|
| 9,470,577 B2 * | 10/2016 | Lian | .......................... G01T 1/02 |
| 2009/0286934 A1 | 11/2009 | Goldacker et al. | |
| 2011/0222375 A1 | 9/2011 | Tsubata et al. | |

FOREIGN PATENT DOCUMENTS

JP   2012-13676 A   1/2012

* cited by examiner

*Primary Examiner* — Edwin Gunberg
(74) *Attorney, Agent, or Firm* — Cha & Reiter, LLC.

(57) ABSTRACT

An electronic device comprising: an ultraviolet (UV) light sensor; and a processor configured to: generate a plurality of initial UV light measurements by using the UV light sensor, wherein each of the plurality of initial UV light measurements is associated with a respective orientation of the electronic device; and select a reference UV light measurement from the plurality.

20 Claims, 9 Drawing Sheets

<301>

<302>

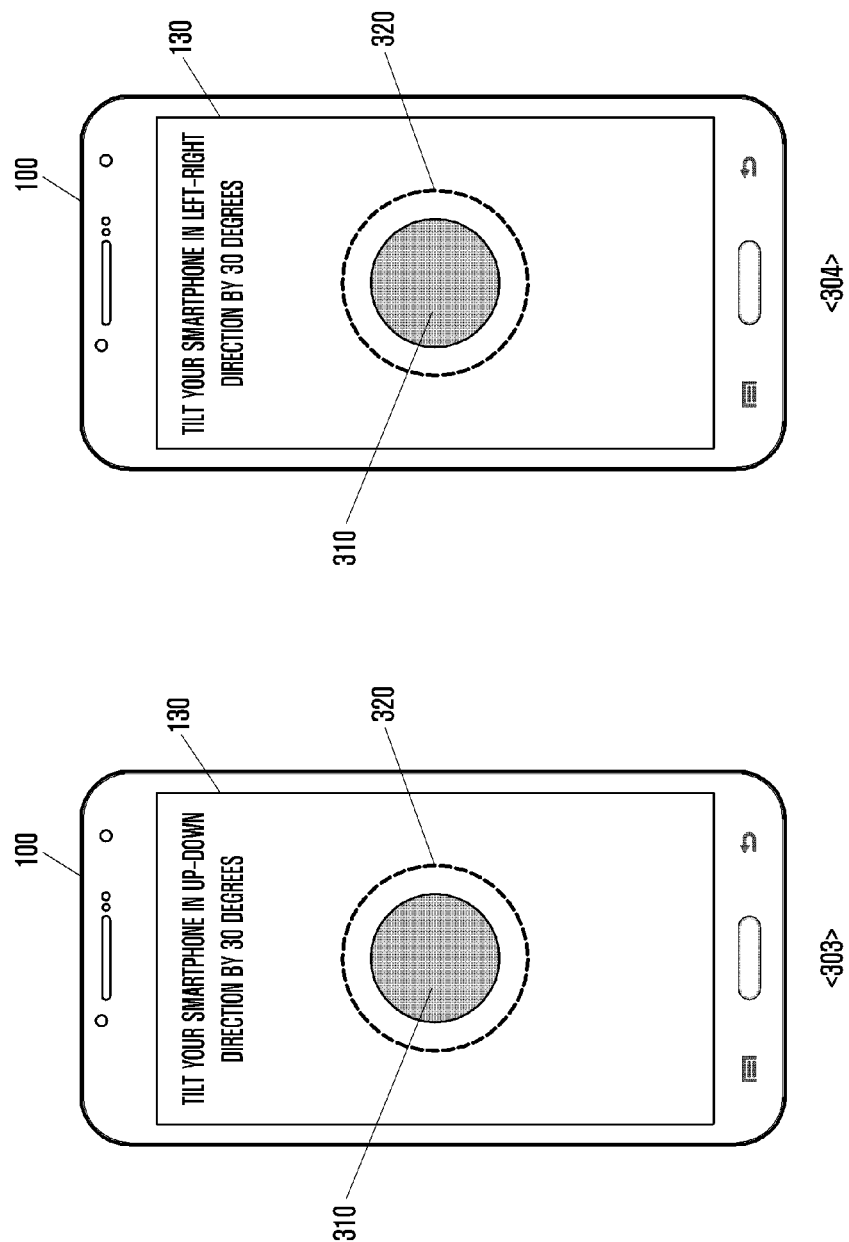

<703>

<701>

METHOD AND APPARATUS FOR MEASURING ULTRAVIOLET LIGHT EXPOSURE

CLAIM OF PRIORITY

This application claims priority from and the benefit under 35 U.S.C. §119(a) of Korean Patent Application No. 10-2014-0140667, filed on Oct. 17, 2014, which is hereby incorporated by reference for all purposes as if fully set forth herein.

BACKGROUND

1. Field of the Disclosure

The present disclosure relates to electronic devices, in general, and more particularly to a method and apparatus for measuring UV light exposure.

2. Description of the Prior Art

As the earth's environment has become polluted, the ozone layer is being severely destroyed, and the amount of UV-B band (280~320 nm), which corresponds to a harmful ultraviolet light reaching the surface of the earth among the lights of the sun, is increasing. A UV-B light has a very bad influence on a person, such as skin cancer or skin aging. Thus, when the amount of ultraviolet light increases, the need to protect skin grows accordingly. To this end, an electronic device that measures ultraviolet light and notifies of the amount thereof is required.

SUMMARY

According to aspects of the disclosure, an electronic device is provided comprising: an ultraviolet (UV) light sensor; and a processor configured to: generate a plurality of initial UV light measurements by using the UV light sensor, wherein each of the plurality of initial UV light measurements is associated with a respective orientation of the electronic device; and select a reference UV light measurement from the plurality.

According to aspects of the disclosure, a method is provided for measuring ultraviolet (UV) light by an electronic device including a UV light sensor, the method comprising: generating a plurality of initial UV light measurements by using the UV light sensor, wherein each of the plurality of initial UV light measurements is associated with a respective orientation of the electronic device; and selecting, by the electronic device, a reference UV light measurement from the plurality.

BRIEF DESCRIPTION OF THE DRAWINGS

The above features and advantages of the present invention will be more apparent from the following detailed description in conjunction with the accompanying drawings, in which:

FIG. 3B is a diagram illustrating an example of the operation of the electronic device of FIG. 1, according to various embodiments of the present disclosure;

DETAILED DESCRIPTION

Figure 1:
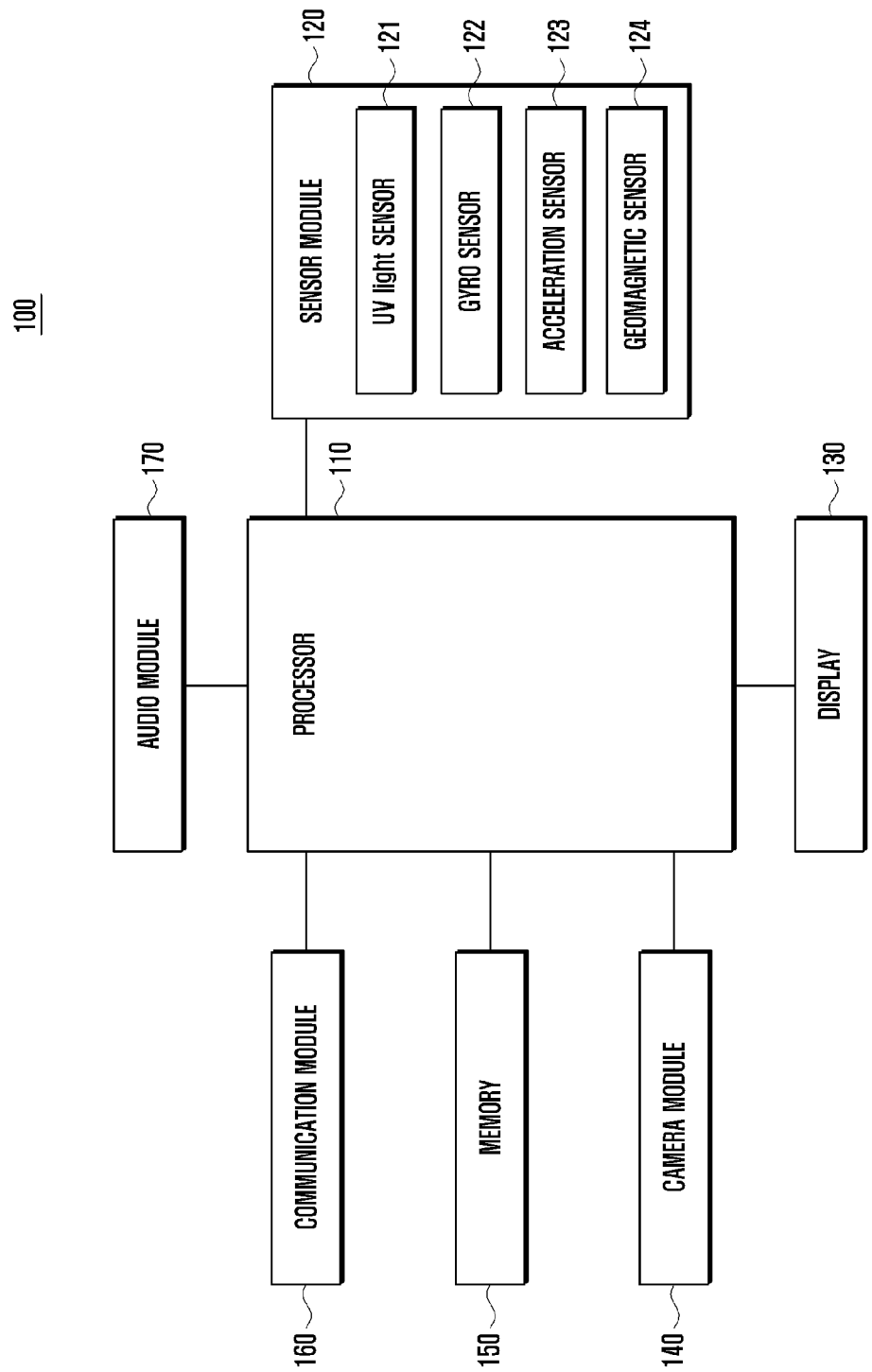
FIG. 1 is a block diagram of an example of an electronic device according to various embodiments of the present disclosure.

Herein, embodiments of the present invention are described in detail with reference to the accompanying drawings. The same or similar components may be designated by the same or similar reference numerals although they are illustrated in different drawings. For the purposes of clarity and simplicity, detailed descriptions of constructions or processes known in the art may be omitted to avoid obscuring the subject matter of the present invention.

The terms and words used in the following description and claims are not limited to the meanings found in an ordinary dictionary, but are merely used to enable a clear and consistent understanding of the present disclosure. Accordingly, it should be apparent to those skilled in the art that the following description of embodiments of the present disclosure is provided for illustration purposes only and not for the purpose of limiting the present invention as defined by the appended claims and their equivalents.

As used herein, the singular forms "a", "an", and "the" are intended to include the plural forms, including "at least one", unless the content clearly indicates otherwise. The term "or" means "and/or". As used herein, the term "and/or" includes any and all combinations of one or more of the associated listed items. It will be further understood that the terms "comprises" and/or "comprising", or "includes" and/or "including" when used herein, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first", "second", "third", etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section could also be referred to as a second element, component, region, layer or section, and vice versa, without departing from the teachings herein.

Herein, an electronic device may be a device that involves a communication function. For example, an electronic device may be embodied as a smartphone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., a Head-Mounted Device (HMD) such as electronic glasses, electronic clothes, an electronic bracelet, an electronic necklace, an electronic appcessory, or a smart watch).

According to an embodiment of the present invention, an electronic device may be a smart home appliance that involves a communication function. For example, an electronic device may be a Television (TV), a Digital Versatile Disc (DVD) player, audio equipment, a refrigerator, an air conditioner, a vacuum cleaner, an oven, a microwave, a washing machine, an air cleaner, a set-top box, a TV box, a game console, an electronic dictionary, an electronic key, a camcorder, or an electronic picture frame.

According to an embodiment of the present invention, an electronic device may be a medical device (e.g., Magnetic Resonance Angiography (MRA), Magnetic Resonance Imaging (MRI), Computed Tomography (CT), ultrasonography, etc.), a navigation device, a Global Positioning System (GPS) receiver, an Event Data Recorder (EDR), a Flight Data Recorder (FDR), a car infotainment device, electronic equipment for ship (e.g., a marine navigation system, a gyrocompass, etc.), avionics, security equipment, or an industrial or home robot.

According to an embodiment of the present invention, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are provided as examples only and are not to be considered a limitation of this disclosure.

A sound output device according to the present invention can be a device including a communication function. For example, a sound output device can be a combination of one or more of various devices such as a wired earphone, a wireless earphone, a wired headset, or a wireless headset. It is obvious to those skilled in the art that the sound output device according to the present invention is not limited to the above-described devices.

According to various embodiments, a technique is provided for measuring the amount of ambient sunlight in the surroundings of a given electronic device. In some instances, the technique can be used on a smartphone, a portable audio player, a fitness tracker, a smartwatch, and/or another device which a user might normally carry on his or her person. An advantage of the technique is that it may alert the user when he or she is about to become subject to excessive ultraviolet light exposure.

According to various embodiments, the technique includes a training phase and a post-training phase. During the training phase, a reference ultraviolet light information (e.g., a reference ultraviolet light measurement) is identified by pointing the electronic directly at the sun. More particularly, during the training phase a plurality of initial ultraviolet measurements may be taken as the user attempts to point the device at the sun, and one of them may be selected as the reference ultraviolet light information (e.g., reference ultraviolet light measurement). The training phase might be necessary because, in some implementations, the sunlight might have to be directly incident on the device's ultraviolet light sensor in order for it to be measured correctly.

During the post-training phase, the electronic device may collect information about the ambient ultraviolet light in the device's surroundings without being particularly pointed at the sun. For example, the device may collect additional ultraviolet light information (i.e., additional ultraviolet light measurements) as it is lying next to the user on the beach. Afterwards, the device may adjust the ultraviolet information by using the reference ultraviolet light information in order to compensate for errors resulting from the device not being directly pointed at the sun. And finally, the device may process the adjusted ultraviolet light information to determine if the user may become subject to excessive ultraviolet light exposure, and output an alert if this is the case.

FIG. 1 illustrates a block diagram of an electronic device 100 according to various embodiments of the present invention.

The electronic device 100 may include: a processor 110; a sensor module 120; a display 130; a camera module 140; a memory 150; a communication module 160; and an audio module 170.

The processor 110 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The processor 110 may receive a command from other components (i.e. the sensor module 120, the display 130, the camera module 140, the memory 150, the communication module 160, the audio module 170, and the like), decode the received command, and execute a calculation according to the decoded command, or data processing. The processor 110 may provide a guide to a user to enable ultraviolet light sensor 121 to measure ultraviolet light. Since the ultraviolet light sensor 121 can measure the maximum amount of the ultraviolet light only when the ultraviolet light is vertically incident to the ultraviolet light sensor 121, the processor 110 can provide the guide to enable the user to turn the ultraviolet light sensor 121 toward the sun. The processor 110 may control the ultraviolet light sensor 121 to measure the amount of the ultraviolet light on the basis of a change in the orientation of the electronic device 100 and generate at least one of ultraviolet light information. The processor 110 may correlate the amount of the ultraviolet light measured in a particular orientation with orientation information of the corresponding orientation. The orientation information may include one or more of an indication of a pitch, an indication of a roll, an indication of a yaw and an indication of an azimuth angle of the electronic device 100. The processor 110 may select reference ultraviolet light information from at least one of generated ultraviolet light information according to a configured reference. The reference may be configured to exclude some erroneously measured amounts of the ultraviolet light among the total measured amounts of the ultraviolet light and select the maximum amount of the ultraviolet light as the amount of the reference ultraviolet light. The processor 110 may convert the selected reference ultraviolet light information into a UV index, and may control the converted UV index to be displayed through the display 130. The processor 110 may provide a notification to the user when a value of the reference ultraviolet light information is equal to or larger than a predetermined value of ultraviolet light information. In a case where the user of the electronic device 100 is in danger when the user is exposed to ultraviolet light having ultraviolet index equal to or more than a predetermined index, if additional measurements of the ambient ultraviolet light in the device's surroundings become higher than a predetermined amount of the ultraviolet light, the processor 110 may notify the user of a dangerous state through a text message or a voice message.

As noted above, after reference ultraviolet information is identified, by purposely pointing the electronic device at the sun, the electronic device may be begin to collect additional ultraviolet light information during the course of the device's normal operation (e.g., when the device is lying next to the user on the beach.) According to various embodiments of the present invention, the processor 110 may adjust the additional ultraviolet information in order to compensate for errors arising from the fact that the electronic device is not necessarily pointed directly at the sun when the additional ultraviolet light measurements are generated. For example, the processor 110 may calculate the angle between the device's orientation when the additional ultraviolet light information is generated and the device's orientation at the time of measuring reference ultraviolet light information and use this angle to compensate for errors that are present in the additional ultraviolet light information. In some implementations, the device's orientation in each instance may be expressed in terms of an angle between an axis of the device and the Earth's center and may be identified by using a built-in accelerometer and/or any other suitable device.

The processor 110 may compensate for an error of additional ultraviolet light information by an amount corresponding to the difference angle, using trigonometric function formulas. The processor 110 may collect the compensated additional ultraviolet light information and provide the accumulative ultraviolet light information to a user. The processor 110 may convert the measured or compensated ultraviolet light information into a UV index and provide the UV index. According to various embodiments of the present invention, in a case where the compensated additional ultraviolet light information is higher than predetermined ultraviolet light information or the compensated additional ultraviolet light index is equal to or larger than a predetermined ultraviolet light index, the processor 110 may provide a notification to the user.

The sensor module 120 may measure a physical quantity or detect an operational state of the electronic device 100 and may convert the measured or detected information to an electric signal. For example, the sensor module 120 may include at least one of ultraviolet light sensor 121, a gyro sensor 122, an acceleration sensor 123, and a geomagnetic sensor 124. The sensor module 120 may further include a control circuit for controlling at least one or more sensors belonging to therein. The ultraviolet light sensor 121 may measure an incident ultraviolet light and generate the incident ultraviolet light as ultraviolet light information. The ultraviolet light information may include a converted ultraviolet light. The gyro sensor 122 may detect a slope of the electronic device 100. The acceleration sensor 123 may detect the orientation of the electronic device 100. The acceleration sensor 123 may identify the orientation of the electronic device 100 using a pitch value, a roll value and a yaw value which the electronic device 100 has in a particular position. The geomagnetic sensor 124 may detect the orientation of the electronic device 100, and may detect a direction to which the electronic device 100 points, or an azimuth angle using an earth magnetic field.

The display 130 may include a panel, a hologram device, or a projector. For example, the panel may be a Liquid Crystal Display (LCD) or an Active Matrix Organic Light Emitting Diode (AM-OLED). For example, the panel may be implemented in a flexible, transparent or wearable manner. The panel may comprise a touch panel and one module. The hologram device can show a stereoscopic image in the air using an interference of light. The projector may display an image by projecting light onto a screen. For example, the screen may be located inside or outside the electronic device 100. The display 130 may further include a panel, a hologram device, or a control circuit for controlling a projector. According to various embodiments of the present invention, the display 130 may display an image of the sun photographed through a camera module 140 as a preview image. The preview image may be an image of the sun photographed in real-time through the camera module 140. The display 130 may display a guide for measuring the amount of the ultraviolet light. The display 130 may display a text message regarding notification of danger when a value of reference ultraviolet light information or additional ultraviolet light information is equal to or larger than a predetermined value of ultraviolet light information.

The camera module 140 is a device for photographing a still image or a video, and may include one or more image sensors (e.g., a front sensor or a rear sensor), a lens (not illustrated), an Image Signal Processor (ISP) (not illustrated), or a flash (not illustrated) (for example, an LED or xenon lamp). According to various embodiments of the present invention, the camera module 140 may photograph an image of the sun.

The memory 150 may include any suitable type of volatile or non-volatile memory, such as Random Access Memory (RAM), Read-Only Memory (ROM), Network Accessible Storage (NAS), cloud storage, a Solid State Drive (SSD), etc. The memory 150 may store a command or data which is received from or generated by the processor 110 or other components (i.e. the sensor module 120, the display 130 and the camera module 140). The memory 150 may include an internal memory or an exterior memory. The internal memory may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). The internal memory may be a Solid State Drive (SSD). The external memory may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory may be functionally connected to the electronic device 100 through various interfaces. According to an embodiment, the electronic device 100 may further include a storage device (or storage medium) such as a hard disc drive. According to various embodiment of the present invention, the memory 150 may store ultraviolet light information relating to orientation information of the electronic device 100. The memory 150 may store at least one of ultraviolet light information, reference ultraviolet light information, additional ultraviolet light information, and accumulative ultraviolet light information. In some instances, the accumulative ultraviolet information may identify the total amount of ultraviolet radiation which the electronic device is exposed to during a given time period and it may be calculated based on the additional ultraviolet light information.

The communication module 160 may transmit and receive data in a communication between the electronic device 100 and other electronic devices connected via a network. According to one embodiment, the communication module 160 may include a cellular module, a Wi-Fi module, a BT module, a GPS module, an NFC module, and a Radio Frequency (RF) module. According to various embodiments of the present invention, the electronic device 100 may identify latitude information, longitude information, and time information through the GPS module, and may identify a current altitude of the sun using the above-mentioned information.

The audio module 170 may bi-directionally convert a sound and an electrical signal. The audio module 170 may process sound information which is input or output through a speaker, a receiver, a microphone, or the like. According to various embodiments of the present invention, the audio module 170 may output a voice message providing directions for orienting the device towards the sun when reference ultraviolet light information is being determined. The audio module 170 may output a voice message for notifying of a danger, when a value of reference ultraviolet light information or additional ultraviolet light information is equal to or larger than a predetermined value of ultraviolet light information.

Figure 2:
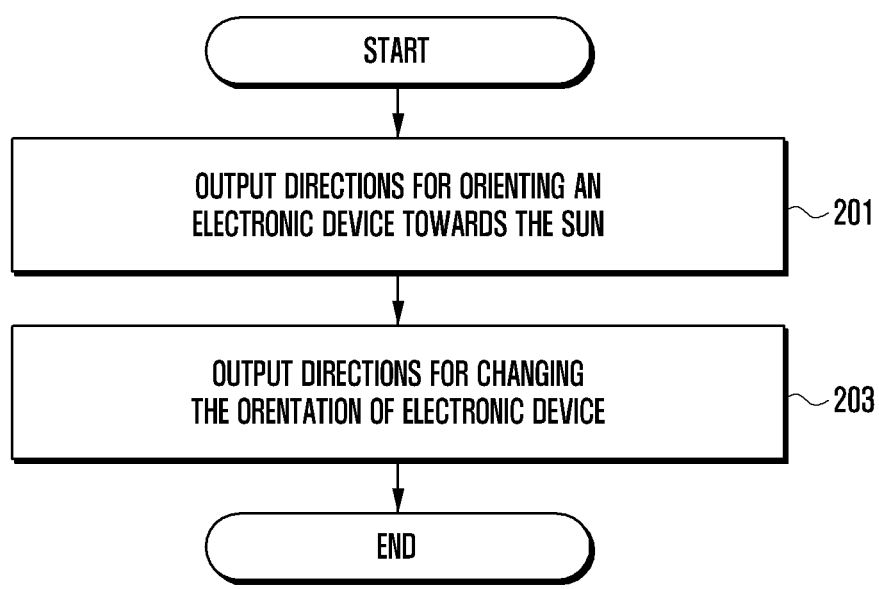
FIG. 2 is flowchart of an example of a process, according to various embodiments of the present disclosure.

FIG. 2 is a flowchart of an example of a process, according to various embodiments of the present disclosure.

Figure 3A:
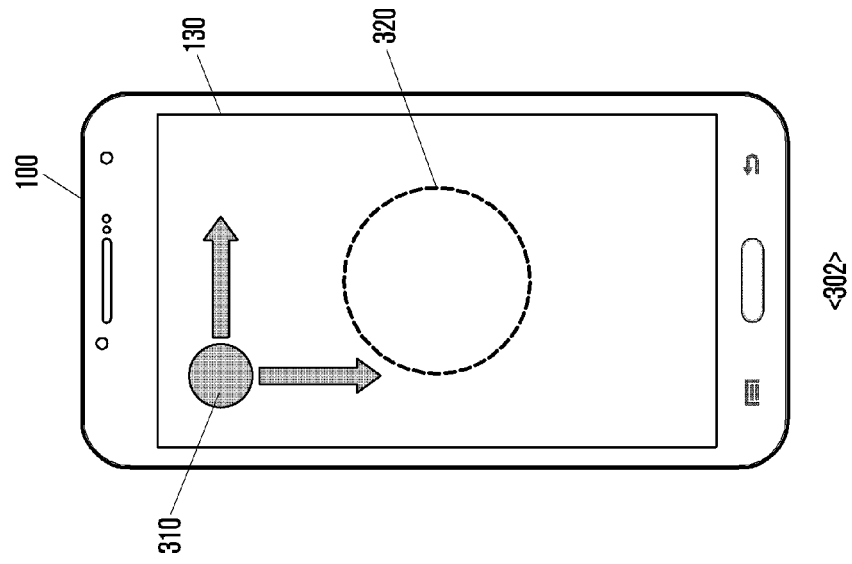
FIG. 3A is a diagram illustrating an example of the operation of the electronic device of FIG. 1, according to various embodiments of the present disclosure.
Figure 3A:
Figure 3A:
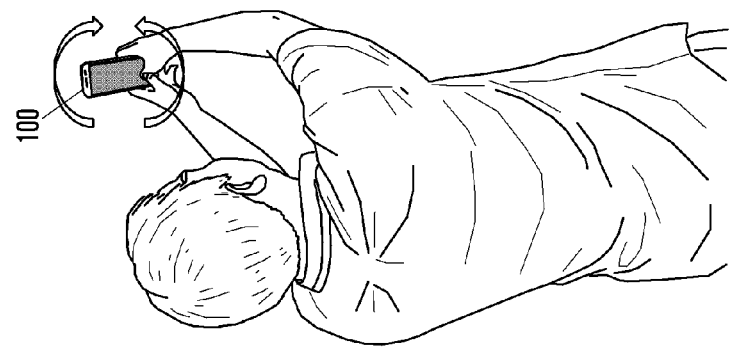

In operation 201, the electronic device 100 may provide directions for orienting the electronic device 100 towards the sun in order to detect ultraviolet light through the ultraviolet light sensor 121. Since the ultraviolet light sensor 121 can measure the maximum amount of the ultraviolet light only when the ultraviolet light is vertically incident to the ultraviolet light sensor 121, the electronic device 100 may provide the directions to enable a user to turn the ultraviolet light sensor 121 toward the sun. According to various embodiments of the present invention, the electronic device 100 may identify latitude information, longitude information, and time information through the GPS module, and may identify a current altitude of the sun using the above-mentioned information. The electronic device 100 may identify a direction in which the sun is located according to a time and an altitude of the sun, and may provide the directions in order to indicate the identified location of the sun to the user. The user may identify a location and altitude of the sun on the basis of the directions provided by the electronic device 100, and may measure the amount of ultraviolet light through the ultraviolet light sensor 121. For example, referring to 301 of FIG. 3A, the user may change a position of the electronic device 100 to turn the ultraviolet light sensor 121 toward the sun and then measure the amount of ultraviolet light. In this case, the electronic device 100 may operate the camera module 140 to display a preview image of the sun in order to easily turn the ultraviolet light sensor 121 to face the sun. For example, referring to 302 of FIG. 3A, the electronic device 100 may display the sun photographed through the camera module 140 as a preview image 310 through the display 130. The electronic device 100 may display an indication of a predetermined area 320 on the display 130 where the sun ought to appear if the user has oriented the electronic device 100 correctly towards the sun. The predetermined area 320 may be identified in accordance with a direction in which the ultraviolet light sensor 121 faces the sun. The electronic device 100 may detect that, the closer the preview image 310 of the sun becomes to the center of the predetermined area 320, the more vertically the ultraviolet light is incident to the ultraviolet light sensor 121. The electronic device 100 may provide the directions in order for the predetermined area 320 to include the preview image 310 of the sun, which has been photographed through the camera module 140. The electronic device 100 may provide the directions to a user through a voice message or a text message. For example, when the preview image 310 of the sun is displayed on the upper-left portion of the display 130, the electronic device 100 may display an arrow pointing to the predetermined area 320 from the preview image 310 of the sun on the display 130. Further, the electronic device 100 may provide a directions voice message through the audio module 170 in order for the predetermined area 320 to include the preview image 310 of the sun. The user may change the orientation of the electronic device 100 on the basis of the directions provided by the electronic device 100. The electronic device 100 may display, on the display 130, the preview image 310 of the sun of which a location is changed according to a change in the orientation.

In operation 203, after the electronic device 100 has assumed its initial position towards the sun, the electronic device 100 may provide directions to the user for varying the orientation of the electronic device 100 with respect to the sun. As the orientation of the electronic device is being varied, the ultraviolet light sensor 121 may measure the amount of available ultraviolet light at various angles. However, the largest amount of the ultraviolet light may be measured from the ultraviolet light, which is vertically incident on the ultraviolet light sensor 121. However, because of possible error margin in the initial position calculations by the device 100 and/or error on part of the user in holding steadily and/or orienting the electronic device 100 towards the sun, the electronic device 100 may take multiple measurements of the ambient ultraviolet light in the device's surroundings at various possible at angles. The electronic device 100 may provide the directions in order for the user to take multiple ultraviolet light measurements. The electronic device 100 may provide a directions for measuring the amount ultraviolet light after the preview image 310 of the sun is caused to appear in the predetermined area 320. For example, referring to 303 and 304 of FIG. 3B, the electronic device 100 may output one or more text messages, such as "tilt your smartphone in the up-down direction by 30 degrees.", "tilt your smartphone in the left-right direction by 30 degrees". The text messages may be output visually on the screen of the electronic device and/or audibly by using one or more of the device's speaker. The user may change the orientation of the electronic device 100 on the basis of the directions provided by the electronic device 100 and measure the amount of ultraviolet light at various positions.

Figure 4:
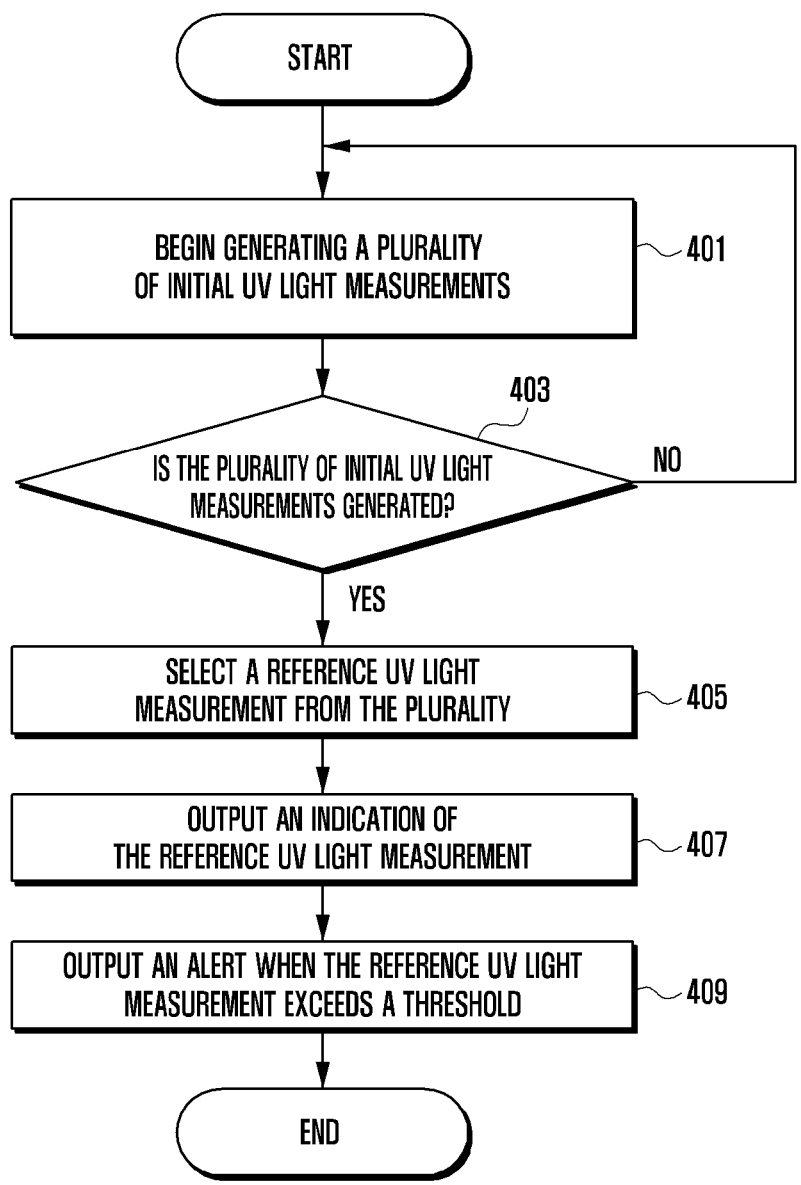
FIG. 4 is a flowchart of an example of a process, according to various embodiments of the present disclosure.

FIG. 4 is a flowchart of an example of a process, according to various embodiments of the present disclosure.

Figure 5A:
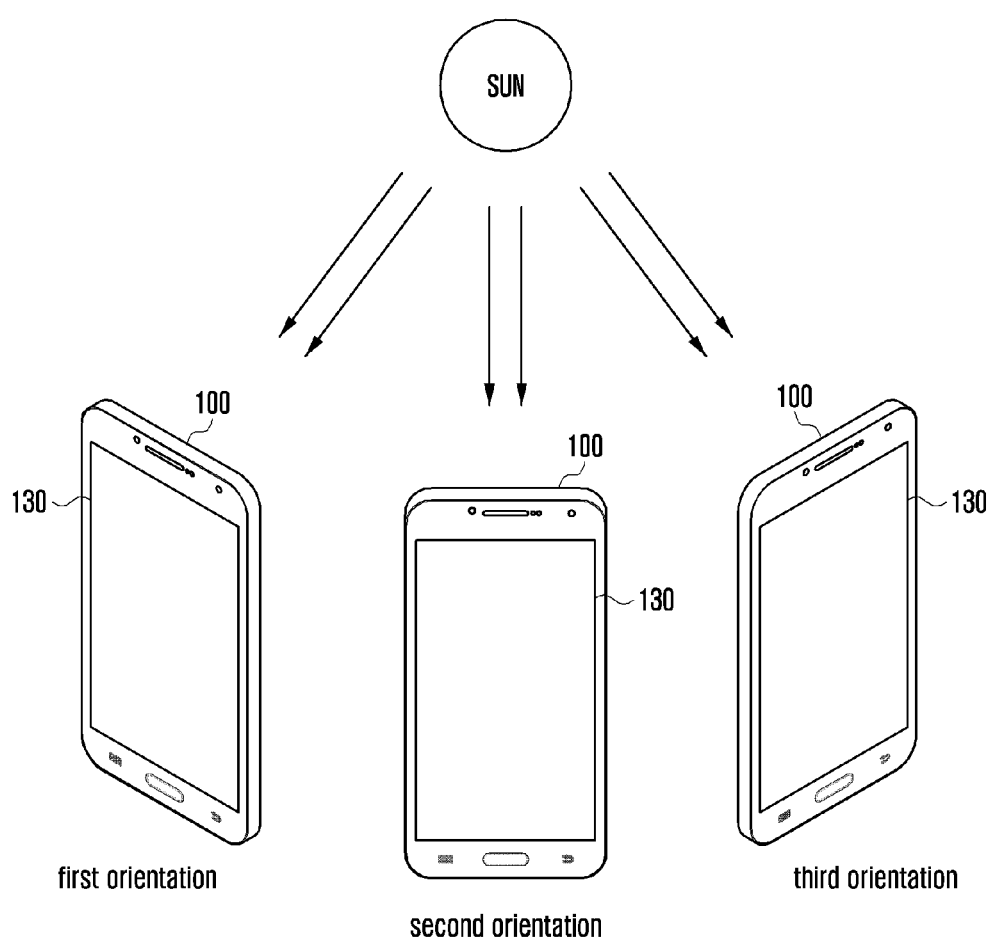
FIG. 5A is diagram illustrating an example of the operation of the electronic device of FIG. 1, according to various embodiments of the present disclosure.

In operation 401, the electronic device 100 may measure the amount of ambient ultraviolet light on the basis of a change in the orientation of the electronic device 100 to generate at ultraviolet light information (e.g., at least one ultraviolet light measurement). The electronic device 100 may measure the amount of ultraviolet light from when the preview image 310 of the sun is included in the predetermined area 320. The user may change the current orientation of the electronic device 100 in order to measure the amount of ultraviolet light at various angles. For example, referring to FIG. 5A, the electronic device 100 may measure the amount of ultraviolet light at a first orientation, a second orientation and a third orientation, respectively, to generate ultraviolet information (e.g., a plurality of ultraviolet light measurements). The electronic device 100 may match orientation information to identify, on the basis of the orientation information, which direction the electronic device 100 is oriented in and what orientation the electronic device 100 is in. The orientation information of the electronic device 100 may include an azimuth angle, a pitch value, a roll value, and a yaw value. For example, the electronic device 100 may identify orientation information including one or more of an azimuth angle, a pitch value, a roll value and a yaw value of the electronic device, and may correlate ultraviolet light information corresponding to the amount of the ultraviolet light measured in the first orientation with the first orientation information. The electronic device 100 may store each correlated result value in the memory 150. The electronic device 100 may measure the amount of the ultraviolet light that is contacting the device at the second orientation, the amount of ultraviolet light that is contacting the device at the third orientation, and the amount of ultraviolet light that is contacting the device at the Nth orientation, and generate ultraviolet light information corresponding to one or more of the ultraviolet light measurements. The electronic device 100 may correlate the ultraviolet light information generated in each orientation with the orientation information of the corresponding orientation and then store the correlated information.

In operation 403, the electronic device 100 may determine whether a sufficient number of ultraviolet light measurements have been taken. The electronic device 100 may determine whether the electronic device 100 rotates in a predetermined direction and measures the amount of ultraviolet light. For example, the electronic device 100 may determine whether the electronic device 100 measures the amount of ultraviolet light in the south-north direction in an orientation in which the electronic faces the sun and then generates ultraviolet light information. The electronic device 100 may determine whether the electronic device 100 measures the amount of ultraviolet light and measures ultraviolet light information while being tilted by a predetermined angle in a particular direction. For example, the electronic device 100 may determine whether the electronic device 100 measures the amount of ultraviolet light in an orientation in which the electronic faces the sun while being tilted by 30 degrees in the east-west direction. The electronic device 100 may determine whether the electronic device 100 has measured the amount of ultraviolet light as many times as a predetermined number of times within a predetermined time interval. For example, the electronic device 100 may determine whether the amounts of 30 ultraviolet light measurements are taken within 5 seconds from when ultraviolet light measurement function starts.

Figure 5B:
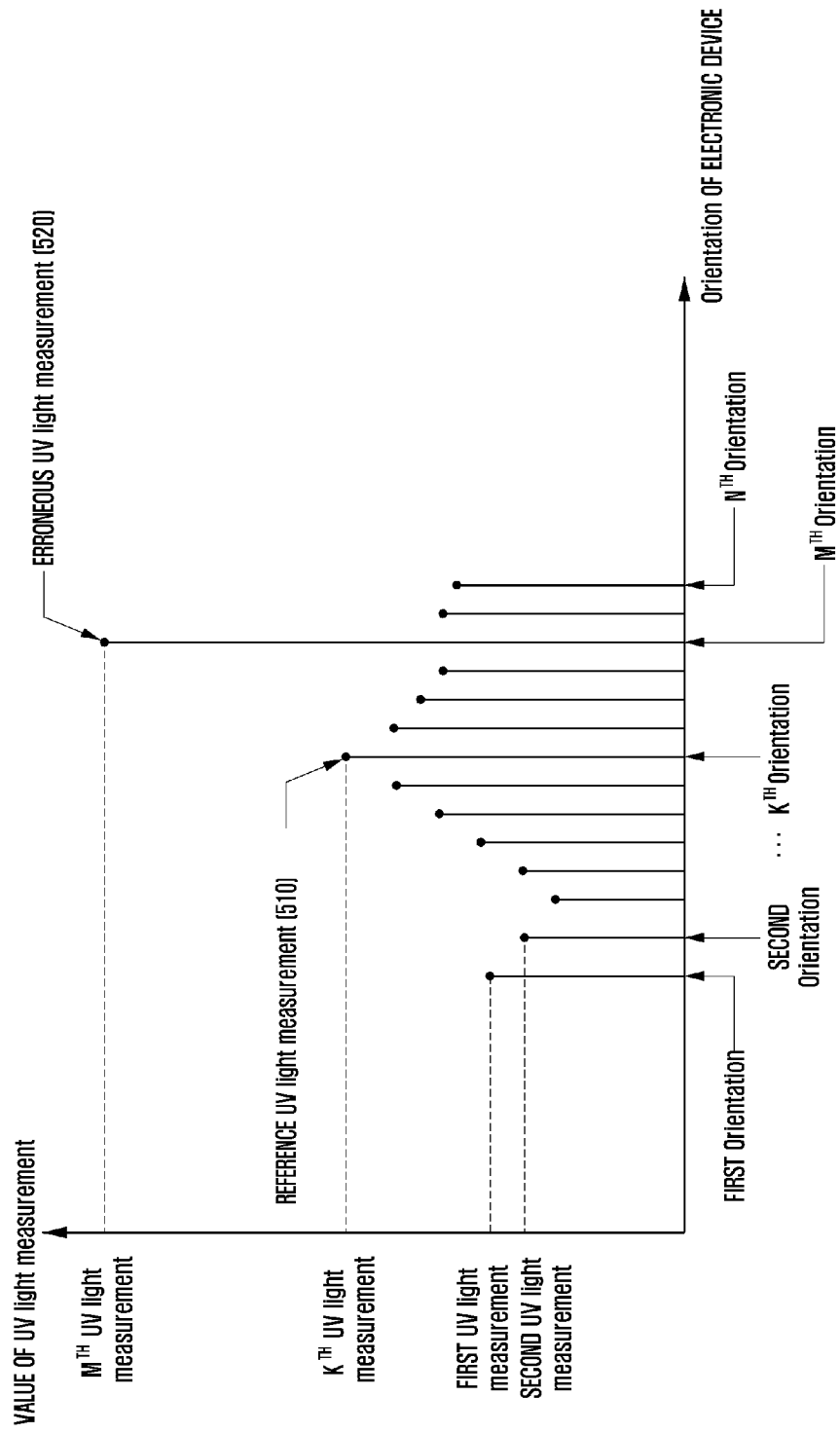
FIG. 5B is a graph illustrating an example of a sample set of UV light measurements taken by the electronic device of FIG. 1, according to various embodiments of the present disclosure.

When the electronic device 100 has generated as much amount of ultraviolet light information as an amount corresponding to a predetermined condition, the electronic device 100 may select reference ultraviolet light information (e.g., a reference ultraviolet light measurement) from among ultraviolet light information generated in operations 401-403. The electronic device may be configured to select, as reference ultraviolet light information, ultraviolet light information having a maximum value from among ultraviolet light information obtained by excluding erroneously measured ultraviolet light information from the generated ultraviolet light information. The reference ultraviolet light information may be a value obtained by measuring the amount of ultraviolet light which is vertically incident to the ultraviolet light sensor 121. Since the amount of ultraviolet light is measured to be a high amount when the ultraviolet light becomes vertically incident to the ultraviolet light sensor 121, the electronic device 100 may select, as reference ultraviolet light information, the highest measured amount of ultraviolet light from among measured amounts of the ultraviolet light. Since the highest amount ultraviolet light is likely to be measured when the electronic device is oriented correctly (i.e. directly facing the sun), selecting the highest ultralight measurement may later on help reduce measurement errors resulting from the electronic device not having an optimal position. That is, the electronic device 100 may select, as reference ultraviolet light information, ultraviolet light information having a maximum value from among ultraviolet light information obtained by excluding a value of ultraviolet light information (ultraviolet light information determined as an erroneous ultraviolet light), which is equal to or larger than a predetermined value of ultraviolet light information, from at least one of generated ultraviolet light information. When ultraviolet light information having a value equal to or larger than a value of determined ultraviolet light information is generated, the electronic device 100 may determine the corresponding ultraviolet light information as erroneous ultraviolet light information. Ultraviolet light information generated due to a malfunction of the ultraviolet light sensor 121 may have a value larger than the amount of ultraviolet light which the sun emits. The electronic device 100 may exclude the erroneous ultraviolet light information in order to collect precise ultraviolet light information. For example, referring to FIG. 5B, the electronic device 100 may measure the amount of at least one ultraviolet light according to a change in its orientation. The electronic device 100 may generate first ultraviolet light information corresponding to the amount of a first ultraviolet light in the first orientation, may generate second ultraviolet light information corresponding to the amount of a second ultraviolet light in the second orientation, and may generate Nth ultraviolet light information corresponding to the amount of an Nth ultraviolet light in the Nth orientation. The electronic device 100 may correlate orientation information with ultraviolet light information corresponding to the measured amount of ultraviolet light and store the correlated result in the memory 150. The electronic device 100 may select reference ultraviolet light information 510 from among the generated ultraviolet information. The electronic device 100 may select, as the reference ultraviolet light information 510, ultraviolet light information having a maximum value from among the ultraviolet light information obtained by excluding erroneous ultraviolet light information 520 from the at least one of generated ultraviolet light information. The electronic device 100 may determine the that amount of ultraviolet light is higher than the amount of ultraviolet light which the sun can emit, as the erroneous ultraviolet light information 520, and exclude the erroneous ultraviolet light information 520 from at least one of ultraviolet light information.

When the electronic device 100 has failed to measure as much amount ultraviolet light information as an amount corresponding to a predetermined condition, the electronic device 100 may return to operation 401 and measure the amount of ultraviolet light in order to generate at least one of ultraviolet light information on the basis of a change in this orientation.

The electronic device 100 may display the selected reference ultraviolet light information on the display 130 in operation 407. The electronic device 100 may convert the ultraviolet light intensity of the reference ultraviolet light information into an UltraViolet (UV) index and display the UV index on the display 130.

The electronic device 100 may provide a notification in operation 409, when a value of the reference ultraviolet light information is equal to or larger than a predetermined threshold. For example, when the predetermined ultraviolet light information or a figure obtained by converting the predetermined ultraviolet light information is 5 and a value of the reference ultraviolet light information is equal to or larger than 5, the electronic device 100 may provide a notification to a user. The electronic device 100 may provide notification of danger to the user through a voice message or a text message. For example, when the reference ultraviolet light information is measured to be 6, the electronic device 100 may display a text message marked "The measured ultraviolet light index is 6. Since the index corresponds to a dangerous index, you should go inside." or output a voice message on the display 130.

Figure 6:
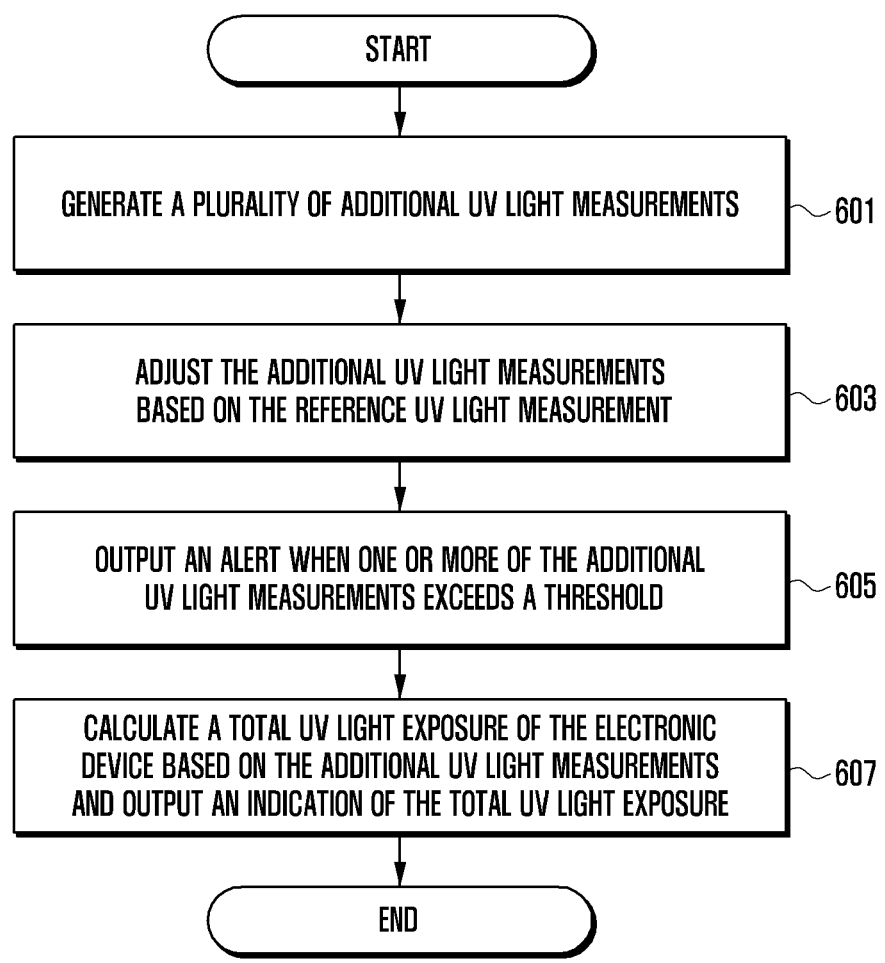
FIG. 6 is flowchart of an example of a process, according to various embodiments of the present disclosure.

FIG. 6 is a flowchart of an example of a process, according to various embodiments of the present invention.

Figure 7:
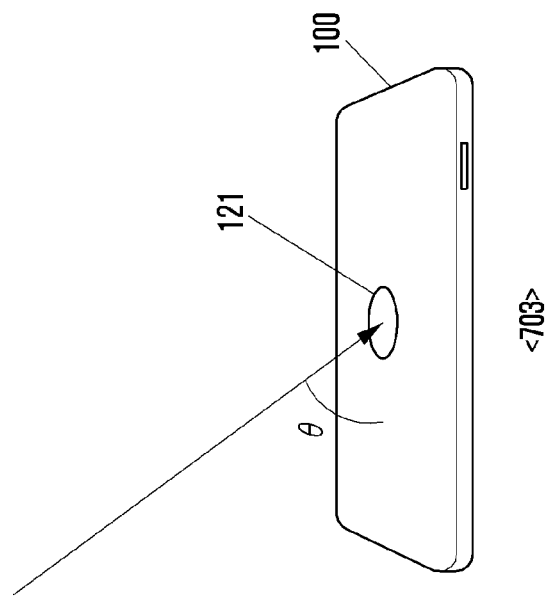
FIG. 7 is a diagram illustrating an example of the operation of the electronic device of FIG. 1, according to various embodiments of the present disclosure.
Figure 7:
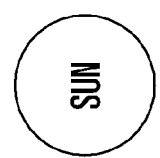
Figure 7:
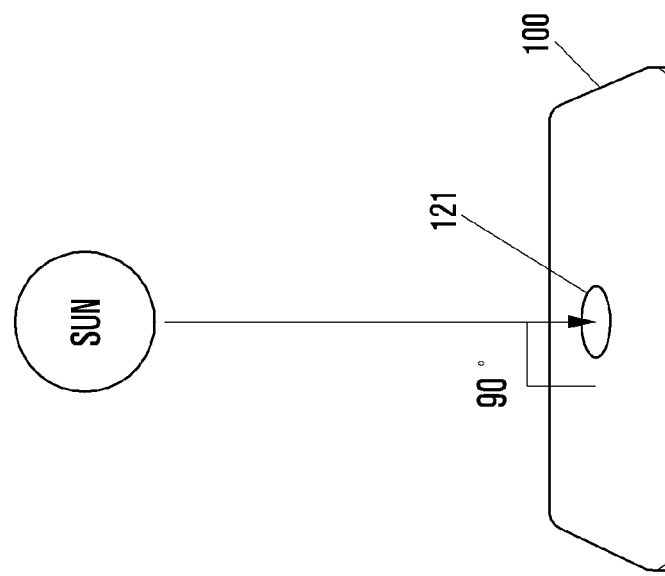
Figure 7:
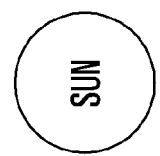

In operation 601, the electronic device 100 may obtain additional ultraviolet light information (e.g., a plurality of additional ultraviolet light measurements). In operation 603, the electronic device 100 may adjust the adjust the additional ultraviolet information on the basis of reference ultraviolet light information. The adjustment may be performed in order to compensate for errors resulting from the electronic device not being directly pointed at the sun when the additional ultraviolet light information is generated. As can be readily appreciated, it is impossible for the user to measure the amount of ultraviolet light so that the ultraviolet light is vertically incident to the ultraviolet light sensor 121 every time of measuring the amount of the ultraviolet light. Thus, when ultraviolet light is incident to the ultraviolet light sensor 121 with a predetermined incidence angle, the electronic device needs to compensate for an error of the ultraviolet light information. That is, since the reference ultraviolet light information is a value obtained by measuring ultraviolet light which is vertically incident to the ultraviolet light sensor 121, the electronic device 100 does not need to compensate for the error. However, since the additional ultraviolet light information is a value obtained by measuring the ultraviolet light having a predetermined incidence angle with regard to the ultraviolet light sensor 121, the electronic device 100 needs to compensate for the error. A method for compensating for an error of the additional ultraviolet light information may include a method for calculating a difference angle of the orientation of the orientation of the electronic device at the time of generating the additional ultraviolet light information on the basis of the orientation of the electronic device at the time of generating the reference ultraviolet light information. The method for compensating for the error of the additional ultraviolet light information may include a method for compensating for an error of the additional ultraviolet light information by an amount corresponding to a difference angle calculated using trigonometric functions. For example, referring to 701 of FIG. 7, the electronic device 100 may select reference ultraviolet light information from among at least one of generated ultraviolet light information. The reference ultraviolet light information may be a value obtained by measuring ultraviolet light which is vertically incident to the ultraviolet light sensor 121. The electronic device 100 may store orientation information at the time of generating the reference ultraviolet light information. The electronic device 100 may compensate for an error of additional ultraviolet light information on the basis of the reference ultraviolet light information. For example, referring to 702 of FIG. 7, the electronic device 100 may generate additional ultraviolet light information corresponding to the amount of the additional ultraviolet light information having a predetermined incidence angle (θ) through the ultraviolet light sensor 121. The additional ultraviolet light information may generate a difference angle by an angle of 90−θ as compared to the reference ultraviolet light information. That is, the electronic device 100 may calculate a difference angle between its orientation at the time of generating reference ultraviolet light information and its orientation at the time of generating additional ultraviolet light information. The electronic device 100 may calculate a difference angle using orientation information at the time of generating the reference ultraviolet light information and orientation information at the time of generating the additional ultraviolet light information. For example, the electronic device 100 may identify an azimuth angle, a pitch value, a roll value, and a yaw value of the electronic device at the time of generating and measuring reference ultraviolet light information and additional ultraviolet light information, and then identify which direction the electronic device 100 is inclined in and how much the electronic device 100 is inclined. The electronic device 100 may calculate the difference angle on the basis of the identified orientation. The electronic device 100 may compensate for an error of additional ultraviolet light information by an amount corresponding to the difference angle using trigonometric functions. In some implementations, the electronic device may use the following equation to calculate the amount of ambient ultraviolet light:

$$A = B/\cos(90-\theta),$$

where A is an adjusted additional ultraviolet light measurement, B is the additional ultraviolet light measurement that is being adjusted, and θ is the incidence angle of sunlight on the electronic device 100, as shown in FIG. 7. As indicated above, in some implementations, theta may be calculated based on the difference between the orientation of the electronic device when the reference ultraviolet and the orientation of the electronic device when the additional ultraviolet measurement B is taken. The difference may be determined by using a built-in accelerometer and/or any other suitable device that is capable of obtaining orientation information.

The electronic device 100 may provide a notification in operation 605, when a value of the compensated additional ultraviolet light information (e.g., ultraviolet light measurement) is equal to or larger than a predetermined value of ultraviolet light information. For example, when the predetermined ultraviolet light information or a figure obtained by converting the predetermined ultraviolet light information is 5 and a value of the additional ultraviolet light information is equal to or larger than 5, the electronic device 100 may provide a notification to the user. The electronic device 100 may provide notification of danger to the user via a voice message or a text message. For example, when a value of the compensated additional ultraviolet light information is 6, the electronic device 100 may display a text message marked "The measured ultraviolet light index is 6. Since the index corresponds to a dangerous index, you should go inside." or output a voice message on the display 130.

The electronic device 100 may collect additional ultraviolet light information and then provide the accumulative ultraviolet light information to the user in operation 607. The electronic device 100 may collect additional ultraviolet light information by a unit of hours, which has been measured in units of predetermined time, and may display, on the display 130, the collected pieces of additional ultraviolet light information when the user requests the accumulative ultraviolet light information.

FIGS. 1-7 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
    an ultraviolet (UV) light sensor;
    a display;
    a camera module; and
    at least one processor configured to:
        display, through the display, a preview image acquired by a camera module, the preview image including an object;
        display, through the display, an indication for locating the object within a predetermine area in the preview image;
        when the object is located in the predetermined area, generate a plurality of initial UV light measurements by using the UV light sensor, wherein each of the plurality of initial UV light measurements is associated with a respective orientation of the electronic device; and
        determine a reference UV light measurement from the plurality of initial UV light measurements.

2. The electronic device of claim 1, wherein selecting the reference UV light measurement comprises:
    generating a filtered set of initial UV light measurements that includes initial light measurements from the plurality that satisfy a predetermined criterion; and
    selecting a largest initial light measurement in the filtered set.

3. The electronic device of claim 1, wherein generating the plurality of initial UV light measurements includes detecting whether a predetermined number of UV light measurements is captured.

4. The electronic device of claim 1, wherein generating the plurality of UV light measurements includes displaying an indication of each measurement's respective orientation before that measurement is captured.

5. The electronic device of claim 1, wherein the at least one processor is further configured to output an indication of the reference UV light measurement.

6. The electronic device of claim 1, wherein the at least one processor is further configured to generate a plurality of additional UV light measurements.

7. The electronic device of claim 6, wherein the at least one processor is further configured to adjust each of the additional UV light measurements based on an angle between an orientation of the electronic device when the additional UV light measurement is generated and an orientation of the electronic device when the reference UV light measurement is generated.

8. The electronic device of claim 6, wherein the at least one processor is configured to output an alert when one or more of the additional UV light measurements exceeds a threshold.

9. The electronic device of claim 6, wherein the at least one processor is further configured to output an indication of one or more of the additional UV light measurements.

10. The electronic device of claim 6, wherein the at least one processor is further configured to:
    calculate a measure of UV light exposure of the electronic device during a given time period based on the plurality of additional UV light measurements; and
    output an indication of the measure of UV light exposure.

11. A method for measuring ultraviolet (UV) light by an electronic device including a UV light sensor, a display and a camera module, the method comprising:
    displaying, through the display, a preview image acquired by a camera module, the preview image including an object;
    displaying, through the display, an indication for locating the object within a predetermine area in the preview image;
    when the object is located in the predetermined area, generating a plurality of initial UV light measurements by using the UV light sensor, wherein each of the plurality of initial UV light measurements is associated with a respective orientation of the electronic device; and
    determining, by the electronic device, a reference UV light measurement from the plurality of initial UV light measurements.

12. The method of claim 11, wherein selecting the reference UV light measurement comprises:
    generating a filtered set of initial UV light measurements that includes initial light measurements from the plurality that satisfy a predetermined criterion; and
    selecting a largest initial light measurement in the filtered set.

13. The method of claim 11, wherein generating the plurality of initial UV light measurements includes detecting whether a predetermined number of UV light measurements is captured.

14. The method of claim 11, wherein generating the plurality of UV light measurements includes displaying an indication of each measurement's respective orientation before that measurement is captured.

15. The method of claim 11, further comprising outputting an indication of the reference UV light measurement.

16. The method of claim 11, further comprising generating a plurality of additional UV light measurements.

17. The method of claim 16, further comprising adjusting each of the additional UV light measurements based on an angle between an orientation of the electronic device when the additional UV light measurement is generated and an orientation of the electronic device when the reference UV light measurement is generated.

18. The method of claim 16, further comprising outputting an alert when one or more of the additional UV light measurements exceeds a threshold.

19. The method of claim 16, further comprising outputting an indication of one or more of the additional UV light measurements.

20. The method of claim 16, further comprising:
calculating a measure of UV light exposure of the electronic device during a given time period based on the plurality of additional UV light measurements; and
outputting an indication of the measure of UV light exposure.

* * * * *